US007149019B2

(12) United States Patent
Ishibe

(10) Patent No.: US 7,149,019 B2
(45) Date of Patent: Dec. 12, 2006

(54) OPTICAL SCANNING SYSTEM AND IMAGE FORMING APPARATUS USING THE SAME

(75) Inventor: Yoshihiro Ishibe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/410,095

(22) Filed: Apr. 25, 2006

(65) Prior Publication Data

US 2006/0238849 A1    Oct. 26, 2006

(30) Foreign Application Priority Data

Apr. 25, 2005  (JP)  ............................. 2005/126491
Mar. 13, 2006  (JP)  ............................. 2006/067782

(51) Int. Cl.
*G02B 26/08*   (2006.01)
*B41J 27/00*   (2006.01)

(52) U.S. Cl. .................. 359/207; 359/204; 359/216; 347/232; 347/241; 347/259

(58) Field of Classification Search ..................... None
See application file for complete search history.

(56) References Cited

U.S. PATENT DOCUMENTS 5,600,476 A     2/1997   Takada et al. .............. 359/206
5,828,401 A  *  10/1998  Shiraishi ..................... 347/259
5,883,732 A     3/1999   Takada et al. .............. 359/207
6,154,245 A  *  11/2000  Kato .......................... 347/244

FOREIGN PATENT DOCUMENTS

EP         730182      9/1996
JP         7-306371    11/1995

* cited by examiner

*Primary Examiner*—James Phan
(74) *Attorney, Agent, or Firm*—Fitzpatrick, Cella, Harper & Scinto

(57) ABSTRACT

Disclosed is an optical scanning system and an image forming apparatus using the same, which is designed to reduce the overall size of the system and to make uniform the light spot diameter in a sub-scan direction, inside an effective scan region, as well as to ensure high-speed production of high-quality images, wherein the optical scanning system includes a light source, a condensing optical system, a deflector and an imaging optical system having one or more optical elements, wherein, in at least one optical element of the optical elements, the curvature of the opposite surfaces thereof changes continuously, inside an effective region, from the optical axis toward the peripheral portion thereof so that the sign of the curvature is reversed at the middle, and wherein, when the curvature radius of the surface of that optical element facing the deflector side, at the optical axis and in the sub-scan sectional plane, is denoted by $r1_0$ while the least quantity of an absolute value of the curvature radius of the surface facing the scan surface side in an effective region of the portion where the sign of the curvature radius is reversed is denoted by $|r2|_{min}$, the optical element satisfies a specific relation for them.

27 Claims, 10 Drawing Sheets

OPTICAL SCANNING SYSTEM AND IMAGE FORMING APPARATUS USING THE SAME

FIELD OF THE INVENTION AND RELATED ART

This invention relates to an optical scanning system and an image forming apparatus using the same. More particularly, the present invention concerns an optical scanning system which is suitably usable in a laser beam printer (LBP), a digital copying machine or a multifunction printer, for example, having an electrophotographic process.

Conventionally, in optical scanning systems used in laser beam printers or digital copying machines, a light flux (light beam) optically modulated and emitted from light source means in accordance with an imagewise signal is periodically deflected by means of an optical deflector that may comprise a polygonal mirror, for example, and the deflected beam is focused into a light spot upon the surface of a photosensitive recoding medium by means of an imaging optical system which may comprise an f-θ lens. By scanning the recording medium surface with this light spot, imagewise recording is carried out.

FIG. 17 is a schematic view of a main portion of a conventional optical scanning system such as described above.

In FIG. 17, light source means 111 produces a light beam which is transformed into parallel light by means of a collimator lens 112. The parallel light beam (light quantity thereof) is then adjusted by an aperture stop 113, and subsequently it enters a cylindrical lens 114 having a refracting power only in a sub-scan sectional plane.

As regards the parallel light incident on the cylindrical lens 114, with respect to the main-scan sectional plane the light exits the lens while keeping its state unchanged but, with respect to the sub-scan sectional plane, it is converged such that a linear image is formed on a reflecting surface (deflecting surface) 115a of an optical deflector 115 that comprises a rotary polygonal mirror.

The light beam reflectively deflected by the reflecting surface 115a of the optical deflector 115 is directed through an imaging optical system (f-θ lens system) 116 having an f-θ characteristic, onto the surface of a photosensitive drum 117, that is, the scan surface to be scanned. By rotating the optical deflector in a direction of an arrow A, the photosensitive drum surface 117 is scanned with the light beam in a direction of an arrow B (main-scan direction), by which imagewise data (information) is recorded thereon.

Here, optical components such as collimator lens 112, cylindrical lens 114 and so on are constituent elements of an incidence optical system LA.

In optical scanning systems and image forming apparatuses such as described above, decreases in cost and size have been desired in recent years. Furthermore, optical scanning systems that can meet high-quality image output and high-speed printing performance are desired.

In an attempt to meet this, an optical scanning system has been proposed in which an imaging optical system is provided by a single imaging lens and, by using a special shape for that lens, good imaging performance is accomplished (see Patent Documents Nos. 1 and 2, below).

In Patent Document No. 1, the lens surface of the imaging lens has an aspherical surface shape, and the amount of change of the curvature thereof in the main-scan sectional plane, inside the light flux, as well as the aspherical shape in the main-scan sectional plane and the curvature in the sub-scan sectional plane are changed.

With this arrangement, good imaging performance is realized and, in addition to this, the beam spot diameter in the sub-scan direction inside the effective scan region is maintained constant, and higher image quality is ensured thereby.

In Patent Document No. 2, the opposite surfaces of an f-θ lens have an aspherical surface shape, and the curvatures of these surfaces in the sub-scan plane are changed continuously, inside an effective region of the lens, from an on-axis portion toward an off-axis portion, by which a change in F number in the sub-scan direction due to the image height of the light beam incident on the scan surface is reduced.

With this arrangement, a change in the sub-scan pitch interval inside the image effective region during multi-beam scan operation is reduced and, on the other hand, the uniformess of the beam spot diameter in the sub-scan direction is improved and higher image quality as well as higher-speed scan are accomplished.

Patent Document No. 1:
  Japanese Laid-Open Patent Application, Publication No. 07-306371

Patent Document No. 2:
  European Patent Publication A3 730182

Patent Document No. 3:
  U.S. Pat. No. 5,883,732

Patent Document No. 4:
  U.S. Pat. No. 5,600,476

However, the optical scanning system of Patent Document No. 1 uses an optical deflector which is especially designed so that, as compared with the angular speed of a light beam that scans the scan center, the angular speed of the same when it scans the scan end is made small. As a result of this, per one revolution of the optical deflector, the deflector can scan the light beam only once. Thus, there is a problem that increasing the speed is difficult to attain.

Furthermore, in the optical scanning system of Patent Document No. 1, although it can realize smallness in size that the scan width is 216 mm and the optical path length is not greater than 150 mm, high-speed scan is difficult to accomplish.

On the other hand, in the optical scanning system of Patent Document No. 2, although it ensures reduction in size as well as higher image quality and higher scan speed, the size has to be reduced more.

In an optical scanning system disclosed in Patent Document No. 3, the curvature of an imaging lens in the sub-scan direction inside the lens effective region, changes continuously in the main-scan direction and yet independently of the curvature thereof in the main-scan direction. With this arrangement, aberrations are corrected well and the optical magnification upon the scan surface, to be scanned, in the sub-scan direction is maintained constant.

However, in the optical scanning system of Patent Document No. 3, the rate of change in the shape of the imaging lens along the main-scan sectional plane is too large so that, through a relative positional deviation of lens surfaces in the main-scan direction, a focus error is easily produced in the main-scan direction.

In an optical scanning system disclosed in Patent Document No. 4, an imaging lens has an aspherical surface shape in the main-scan sectional plane which aspherical shape is designed to satisfy a desired conditional equation, by which deformation of the beam spot shape is avoided and the optical magnification in the sub-scan direction is maintained constant.

However, for a thin lens which is particularly preferable when an imaging lens is to be produced by plastic molding, the optical magnification on the scan surface in the sub-scan direction can not be maintained exactly constant.

Furthermore, there is an inconvenience that, due to a relative positional deviation of the lens surfaces in the main-scan direction, a focus error in the main-scan direction is easily produced.

Moreover, in order that the optical magnification on the scan surface in the sub-scan direction is made constant, the thickness of the imaging lens has to be enlarged which is very undesirable when the imaging lens produced in accordance with a plastic molding process.

SUMMARY OF THE INVENTION

The present invention has been made to solve or reduce at least one of the inconveniences described hereinbefore, and it is accordingly an object of the present invention to realize that, even when the thickness of an imaging lens is made small to meet low-cost plastic molding, the optical magnification upon a scan surface in the sub-scan direction is maintained constant.

It is another object of the present invention to provide a scanning lens which is easy to manufacture and by which deterioration of the light spot shape as well as degradation of performance due to a relative positional deviation of the lens surfaces are prevented or reduced.

It is a yet further object of the present invention to provide an optical scanning system by which the overall size of the optical scanning system can be made small, by which the light spot diameter in the sub-scan direction can be made uniform inside an effective scan region, by which both of single-beam scan and multiple-beam scan can be met, and by which higher-quality images can be produced at higher speed.

It is a still further object of the present invention to provide an image forming apparatus having an optical scanning system such as described above.

In accordance with an aspect of the present invention, to achieve at least one of the objects described above, there is provided an optical scanning system, comprising: light source means; deflecting means configured to deflect a light beam emitted from said light source means in a main-scan direction; and an imaging optical system configured to image the light beam, deflected by said deflecting means, on a scan surface to be scanned; wherein, in a sub-scan sectional plane, said imaging optical system is configured to place a deflecting surface of said deflecting means and the scan surface in a conjugate relationship with each other; wherein a curvature, in the sub-scan sectional plane, of both of a light entrance surface and a light exit surface of at least one imaging optical element that is a constituent component of said imaging optical system changes, inside an effective region, continuously from an optical axis of said imaging optical system toward a peripheral portion of the same, and wherein a sign of each of the curvatures of the light entrance surface and the light exit surface of said imaging optical element with respect to the sub-scan sectional plane is reversed within the effective region; wherein, when a curvature radius of the light entrance surface of said imaging optical element at the optical axis thereof, with respect to the sub-scan sectional plane, is denoted by $rl_0$ and when a least quantity of an absolute value of the curvature radius in the sub-scan sectional plane of a portion inside the effective region, in which portion the sign of the curvature is reversed with respect to the curvature of the light exit surface of said imaging optical element at the optical axis thereof, in the sub-scan sectional plane, is denoted by $|r2|_{min}$, the following relations $rl_0 < 0$ and
$|rl_0| < |r2|_{min}$ are satisfied; and wherein, when a shape x of the light entrance surface or the light exit surface of said imaging optical element in a main-scan sectional plane is expressed in terms of a function $x=g(y)$ of an arbitrary coordinate y in the main-scan direction inside an effective scan region of said imaging optical element and when an absolute value of a difference between a second differential quantity of x at the coordinate y and a second differential quantity of x at a coordinate y+0.01 is denoted by $|\delta d^2 x/dy^2|$, both the light entrance surface and the light exit surface of said imaging optical element satisfy the following relation
$|\delta d^2 x/dy^2| < 0.00003$.

In one preferred form of this aspect of the present invention, when the curvature radius of the light entrance surface or the light exit surface of said imaging optical element in the sub-scan sectional plane is denoted by r', and when the curvature 1/r' in the sub-scan sectional plane is expressed in terms of a function $1/r'=f(y)$ of the coordinate y of the imaging optical element in the main-scan direction, in relation to both the light entrance surface and the light exit surface of said imaging optical element an absolute value of a first differential of the curvature 1/r' satisfies the following relation $$\left| \frac{d}{dy} \frac{1}{r'} \right| = \left| \frac{d}{dy} f(y) \right| \leq 2.0 \times 10^{-2}$$

The imaging optical system may have only one imaging optical element.

The light beam incident on said imaging optical element may a convergent light beam with respect to the main-scan sectional plane.

In the main-scan sectional plane, both surfaces of said imaging optical element may have a non-arcuate shape.

In the main-scan sectional plane, the light entrance surface of said imaging optical element may have a convexed shape, at the optical axis of said imaging optical element, facing the deflecting means side.

In the main-scan sectional plane, the light entrance surface of said imaging optical element may a concaved shape, at the peripheral portion thereof, facing the deflecting means side, and the sign of the curvature of the light entrance surface of said imaging optical element ma be reversed inside the effective region.

In the main-scan sectional plane, the light exit surface of said imaging optical element may have a concaved shape, at the optical axis of said imaging optical element, facing the scan surface side.

In the main-scan sectional plane, the light exit surface of said imaging optical element may have a convexed shape, at the peripheral portion thereof, facing the scan surface side, and the sign of the curvature of the light exit surface of said imaging optical element may be reversed inside the effective region.

In the main-scan sectional plane, the curvature of at least one optical surface of said imaging optical element may change continuously and asymmetrically from the optical axis toward the peripheral portion thereof.

In the sub-scan sectional plane, the curvature of at least one optical surface of said imaging optical element may change continuously and asymmetrically from the optical axis toward the peripheral portion thereof.

In accordance with another aspect of the present invention, there is provided an optical scanning system, comprising: light source means; deflecting means configured to deflect a light beam emitted from said light source means in a main-scan direction; and an imaging optical system configured to image the light beam, deflected by said deflecting means, on a scan surface to be scanned; wherein, in a sub-scan sectional plane, said imaging optical system is configured to place a deflecting surface of said deflecting means and the scan surface in a conjugate relationship with each other; wherein a light entrance surface of at least one imaging optical element that is a constituent component of said imaging optical system has, at an optical axis thereof, a convexed shape facing the deflecting means side with respect to a main-scan sectional plane and a concaved shape facing the deflecting means side with respect to the sub-scan sectional plane; wherein the light entrance surface of said imaging optical element has, at a peripheral portion thereof, a concaved shape facing the deflecting means side with respect to the main-scan sectional plane and a convexed shape facing the deflecting means side with respect to the sub-scan sectional plane; wherein a light exit surface of said imaging optical element has, at the optical axis thereof, a concaved shape facing the scan surface side with respect to the main-scan sectional plane and a convexed shape facing the scan surface side with respect to the sub-scan sectional plane; wherein the light exit surface of said imaging optical element has, at a peripheral portion thereof, a convexed shape facing the scan surface side with respect to the main-scan sectional plane and a concaved shape facing the scan surface side with respect to the sub-scan sectional plane; and wherein, when the shape x of the light entrance surface or the light exit surface of said imaging optical element in the main-scan sectional plane is expressed in terms of a function x=g(y) of an arbitrary coordinate y in the main-scan direction inside an effective scan region of said imaging optical element and when an absolute value of a difference between a second differential quantity of x at the coordinate y and a second differential quantity of x at a coordinate y+0.01 is denoted by $|\delta d^2x/dy^2|$, both the light entrance surface and the light exit surface of said imaging optical element satisfy the following relation $|\delta d^2x/dy^2|<0.00003$.

Briefly, in accordance with the present invention, the shape of an imaging optical element or the like that constitutes an imaging optical system is designed in the best way to reduce the overall size of the optial scaning system and also to make uniform the light spot diameter in the sub-scan direction, throughout the effective scan region.

Furthermore, in accordance with the present invention, an optical scanning system and an image forming apparatus that can meet both of single-beam scan and multiple-beam scan and that can produce higher-quality images at higher speed are accomplished.

These and other objects, features and advantages of the present invention will become more apparent upon a consideration of the following description of the preferred embodiments of the present invention taken in conjunction with the accompanying drawings.

is plotted while the lens-lengthwise-direction coordinate y is taken on the axis of abscissas.

Figure 10:
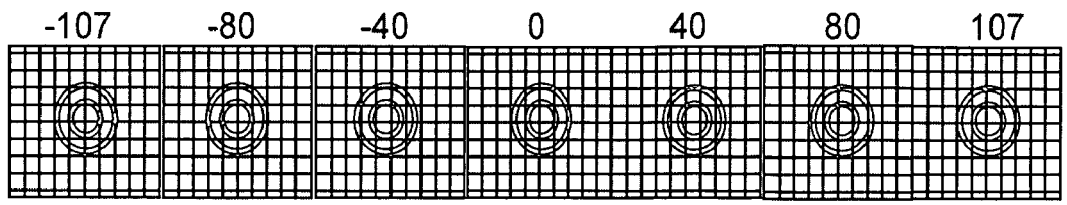

FIG. 10 is an illustration, showing profiles of light spots at respective scan positions upon the scan surface, in the first embodiment of the present invention.

Figure 11:
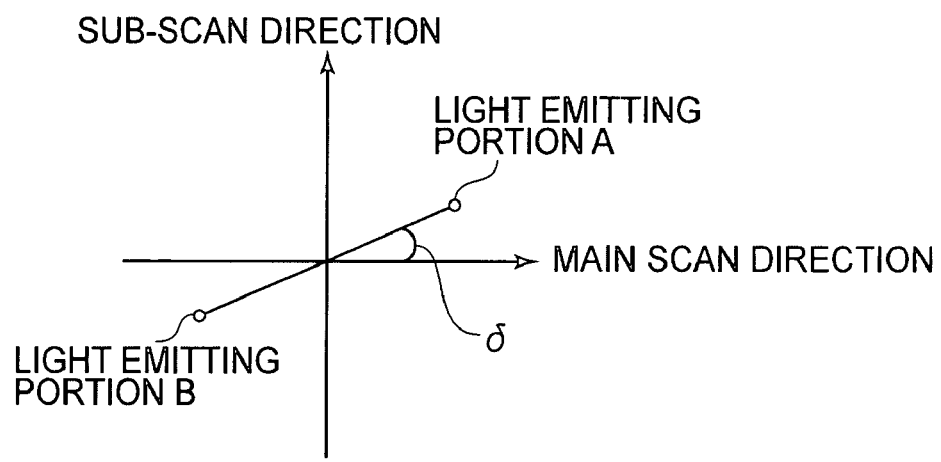

FIG. 11 is a schematic view for explaining disposition of a light source in a second embodiment of the present invention.

Figure 12:
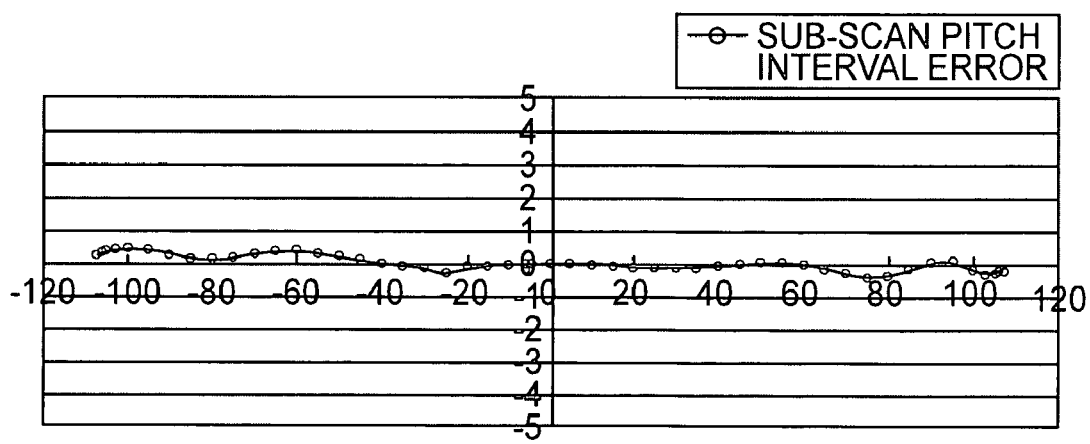

FIG. 12 is a graph for explaining pitch interval errors of two beams upon the scan surface, with respect to a predetermined value 42.3 μm in the sub-scan direction, in the second embodiment of the present invention.

Figure 13:
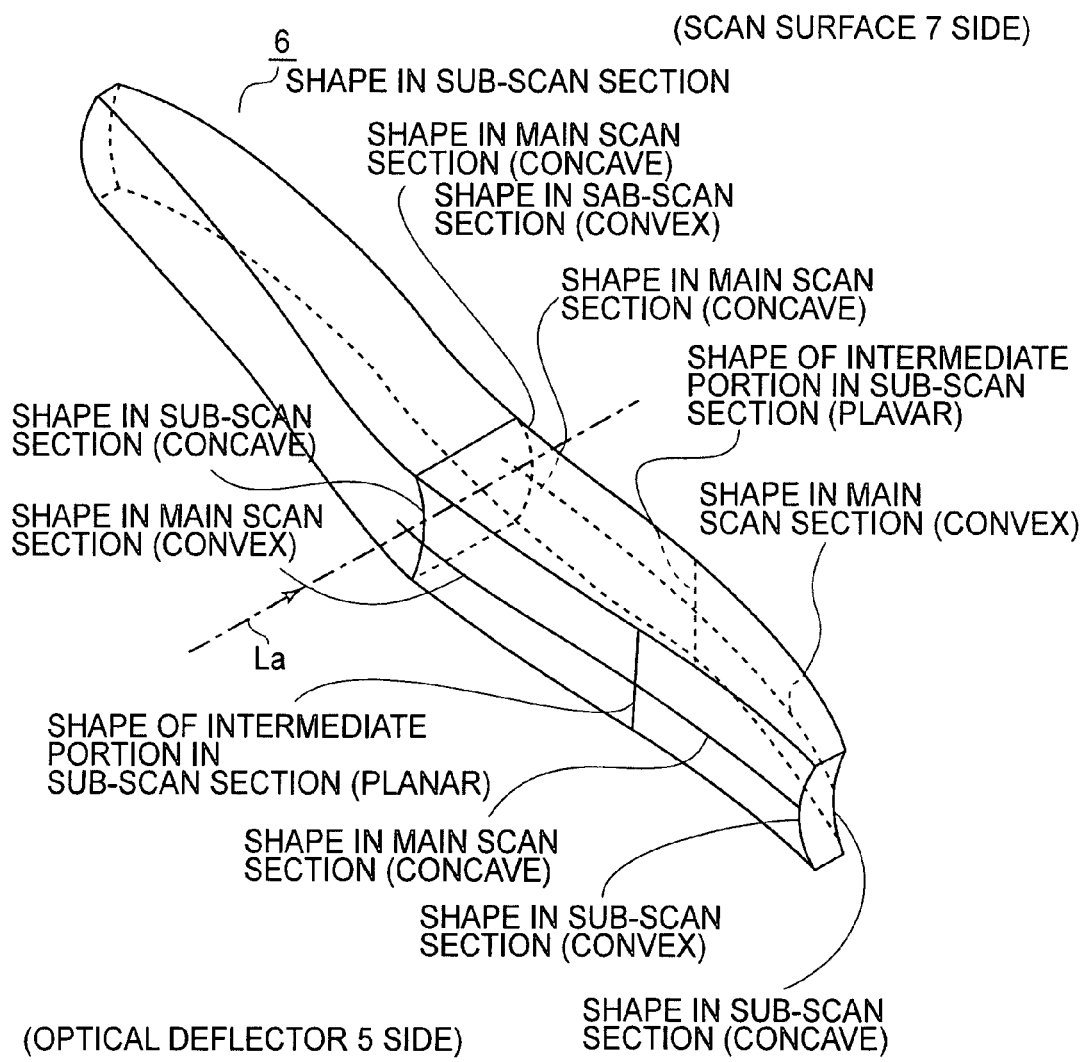

FIG. 13 is a schematic and perspective view of an f-θ lens according to an embodiment of the present invention.

Figure 14:
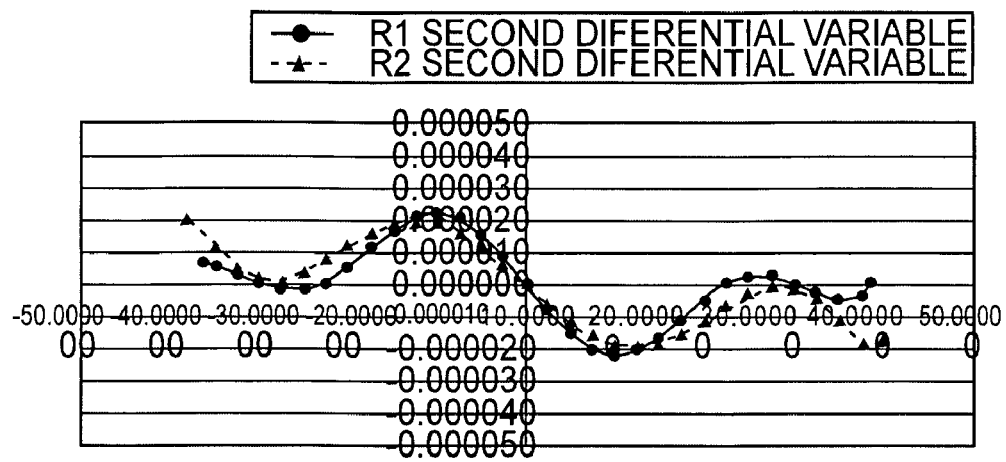

FIG. 14 is a graph wherein an absolute value $|\delta d2x/dy2|$ of the difference between a second differential quantity of x at a lens surface position y and a second differential quantity of x at another lens surface position y+0.01 in the main-scan direction, of the opposite surfaces of the f-θ lens, according to the first embodiment of the present invention, is plotted while the lens-lengthwise-direction coordinate y is taken on the axis of abscissas.

Figure 15:
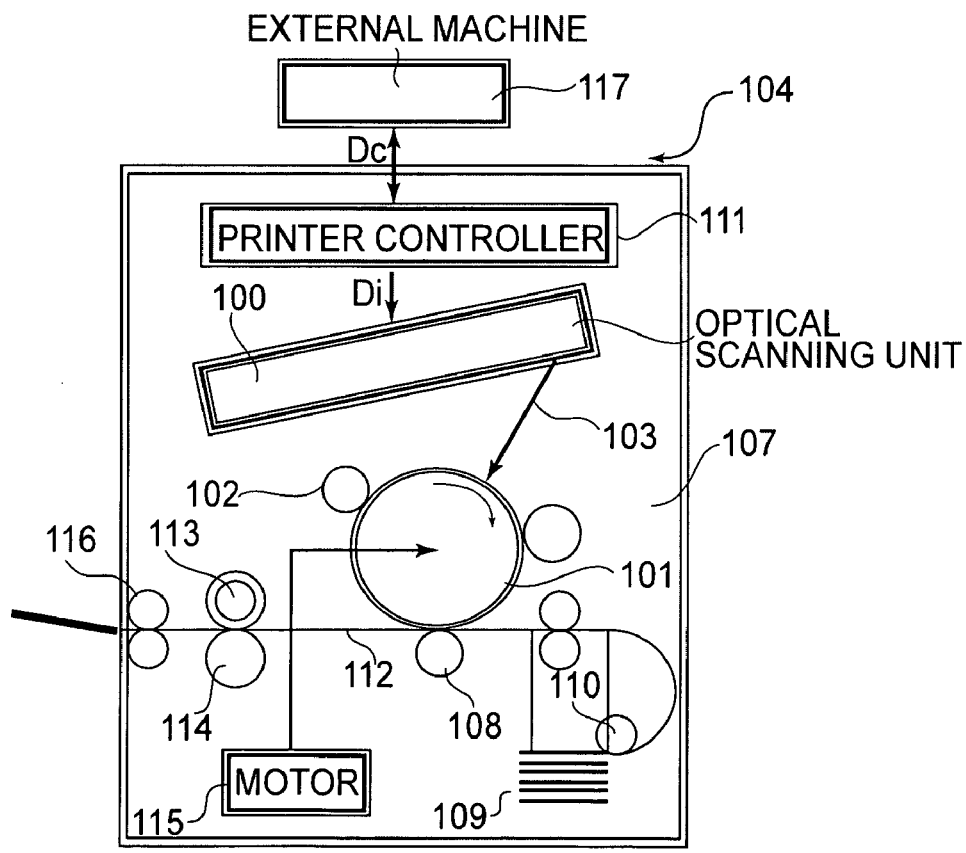

FIG. 15 is a schematic and sectional view, taken along the sub-scan sectional plane, of an image forming apparatus according to an embodiment of the present invention.

Figure 16:
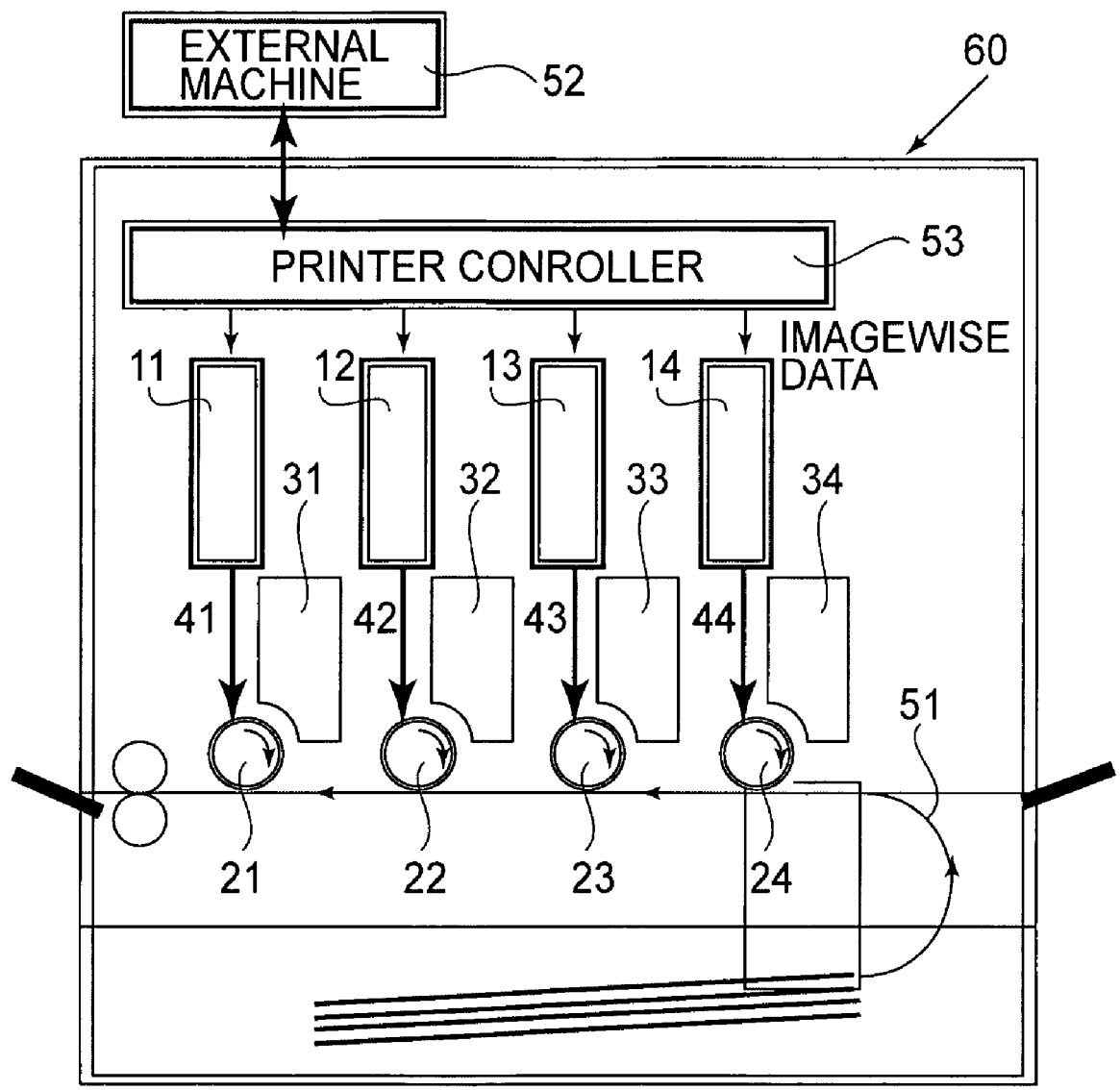

FIG. 16 is a schematic and sectional view, taken along the sub-scan sectional plane, of a color image forming apparatus according to an embodiment of the present invention.

Figure 17:
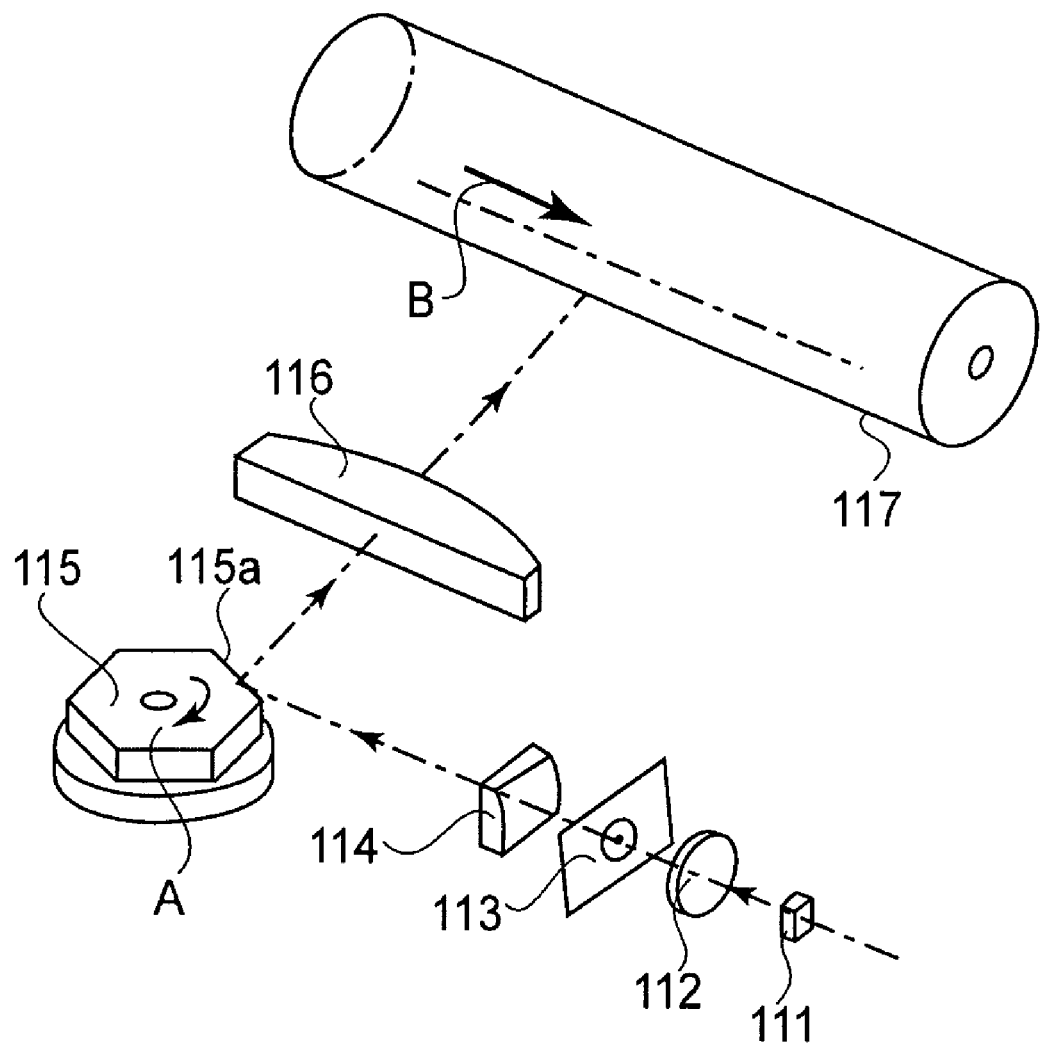

FIG. 17 is a schematic view of a main portion of a conventional optical scanning system.

DESCRIPTION OF THE PREFERRED EMBODIMENTS

Preferred embodiments of the present invention will now be described with reference to the attached drawings.

Embodiment 1

Figure 1A:
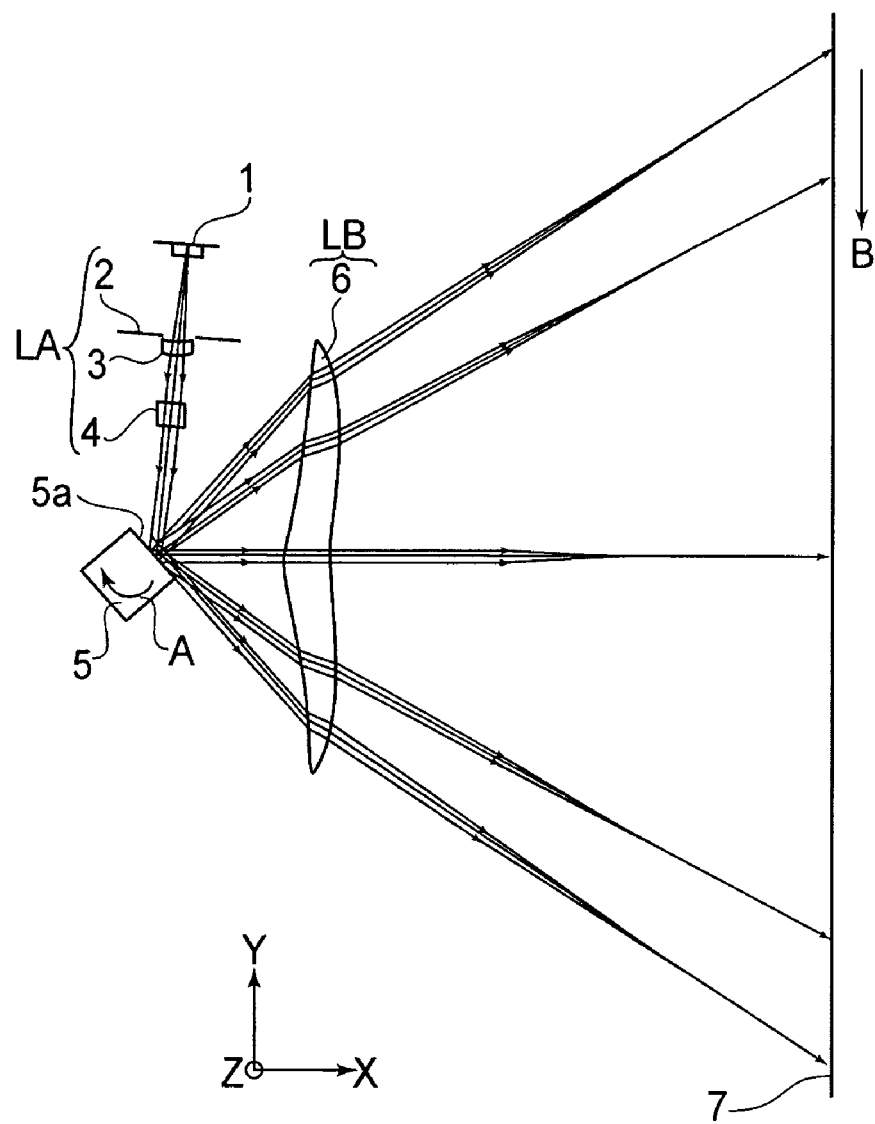
FIG. 1A is a sectional view in the main-scan direction of a main portion of an optical scanning system according to a first embodiment of the present invention.
Figure 1B:
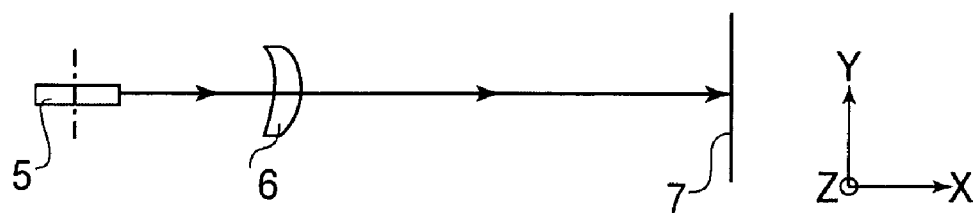
FIG. 1B is a sectional view in the sub-scan direction of a main portion of the optical scanning system according to the first embodiment of the present invention.

FIG. 1A is a sectional view (main-scan sectional view) in the main-scan direction of a main portion of an optical scanning system according to a first embodiment of the present invention. FIG. 1B is a sectional view (sub-scan sectional view) in the sub-scan direction of the main portion of the optical scanning system according to the first embodiment of the present invention.

Here, the term "main-scan direction" refers to the direction which is perpendicular to the rotational axis of a rotary polygonal mirror and to the optical axis of an imaging optical system, that is, the direction in which a light beam is reflectively deflected (deflectively scanned) by the rotary polygonal mirror.

The term "sub-scan direction" refers to the direction which is parallel to the rotational axis of the rotary polygonal mirror.

The term "main-scan sectional plane" refers to a plane that contains the main-scan direction and the optical axis of the imaging optical system.

The term "sub-scan sectional plane" refers to the plane perpendicular to the main-scan sectional plane.

Denoted in FIG. 1A at 1 is a light source means which may comprise a semiconductor laser, for example. Denoted at 2 is an aperture stop that serves to restrict the light beam passing therethrough to adjust the shape of the light beam. Denoted at 3 is a condensing lens (collimator lens) that functions as a condensing optical system to transform a divergent light flux demitted from the light source means 1 into a convergent light flux.

Denoted at 4 is a cylindrical lens having a predetermined power only with respect to the sub-scan sectional plane (sub-scan direction). With this cylindrical lens, the light beam passed through the condensing lens 3 is imaged with respect to the sub-scan sectional plane as a linear image, upon the reflecting surface (deflecting surface) 5a of an optical deflector 5, details of which will be described later.

The function of the condenser lens 3 and the cylindrical lens 4 may be provided by use of a single optical element.

The optical components such as aperture stop 2, condenser lens 3 and cylindrical lens 4 are constituent elements of an incidence optical system LA.

Denoted at 5 is an optical deflector (deflecting means) which may comprise a polygonal mirror (rotary polygon) having four deflecting surfaces, for example. It can be rotated by means of a motor (driving means), not shown, in a direction of an arrow A in the drawing, at a constant speed.

Denoted at LB is an imaging optical system having a light condensing function and an f-θ characteristic. It consists of a single f-θ lens (imaging optical element) and it serves to image a light beam reflectively deflected by the optical deflector 5 and being based on imagewise data, upon a photosensitive drum surface 7, that is, a scan surface to be scanned.

In the sub-scan sectional plane, the reflecting surface 5a of the optical deflector 5 and the photosensitive drum surface 7 are placed in an optically conjugate relationship with each other, by which tilt correction is accomplished.

In the first embodiment of the present invention, the imaging optical system 6 is provided by a single imaging optical element.

Here, the imaging optical system 6 as provided by a single imaging optical element means that, except the single imaging optical element, the imaging optical system does not include any mirror having an imaging function or any imaging lens of small power, but a simple light-path bending mirror (flat mirror) may be included there.

Denoted at 7 is the photosensitive drum surface which corresponds to the scan surface to be scanned.

In this embodiment, a divergent light beam emitted from a semiconductor laser 1 is restricted (in light quantity) by means of the aperture stop 2, and then it is transformed into a convergent light beam by means of the condensing lens 3. The convergent light beam is then incident on the cylindrical lens 4.

As regards the convergent light beam incident on the cylindrical lens 4, with respect to the main-scan sectional plane the light exits therefrom while keeping the state thereof unchanged. With respect to the sub-scan sectional plane, on the other hand, the light is further converged so that it is imaged upon the reflecting surface 5a of the optical deflector 5 as a linear image (linear image being elongated in the main-scan direction).

The light beam reflectively deflected by the reflecting surface 5a of the optical deflector 5 is then imaged through the f-θ lens 6 upon the photosensitive drum surface 7, as a light spot. By rotating the optical deflector 5 in the direction of an arrow A, the photosensitive drum surface 7 is optically scanned in the direction of an arrow B (main-scan direction) at a constant speed. Through this procedure, imagewise recording is carried out on the photosensitive drum surface (recording medium surface) 7.

Next, the f-θ lens 6 that constitutes the imaging optical system LB of this embodiment will be explained.

FIG. 13 is a schematic and perspective view of a main portion of the f-θ lens 6 according to this embodiment of the present invention.

With respect to the main-scan sectional plane (main-scan direction), the f-θ lens 6 functions to image the convergent light beam incident thereon, upon the photosensitive drum surface 7. On the other hand, with respect to the sub-scan sectional plane (sub-scan direction), it serves to re-image the light beam, having been imaged on the deflecting surface 5a of the optical deflector 5, upon the photosensitive drum surface 7, thereby to accomplish tilt correction.

The f-θ lens 6 consists of a single imaging lens, and it has lens surfaces both having a non-arcuate shape in the main-scan sectional plane.

As best seen in FIGS. 1 and 13, at the optical axis portion (on-axis portion) of the lens, the surface of the f-θ lens 6 at the optical deflector 5 side has a convexed shape, with respect to the main-scan sectional plane, facing the optical deflector 5 side; whereas the surface of the f-θ lens at the scan surface 7 side has a concave shape facing the scan surface 7 side.

By specifying the lens shape at the lens optical-axis portion with respect to the main-scan sectional plane as described above, the principal plane of the lens in the main-scan sectional plane can be defined closer to the optical deflector side and, as a result, the distance from the optical deflector to the scan surface (hereinafter, "optical path length") can be reduced such that size reduction is realized.

Furthermore, since in this embodiment a light beam being convergent in the main-scan sectional plane is incident on the f-θ lens, the optical path length can be reduced further.

In a specific example according to this embodiment, the optical path length is equal to 139.142 mm. Thus, a quite compact optical scanning system is accomplished.

On the other hand, at the peripheral portion (off-axis portion) of the lens with respect to the main-scan direction (lengthwise direction of the lens), the light entrance surface of the f-θ lens 6 at the optical deflector 5 side has a concaved shape, with respect to the main-scan sectional plane, facing the optical deflector 5 side; whereas the light exit surface of the lens at the scan surface 7 side has a convexed shape facing the scan surface 7 side. By specifying such lens shape, coma aberration in the main-scan direction can be well corrected and, additionally, the f-θ characteristic can be corrected well.

In accordance with this embodiment, as described above, the curvatures of both surfaces of the f-θ lens in the main-scan sectional plane are changing continuously from the lens optical axis (on-axis) toward the lens peripheral portion (off-axis), and the sign of each curvature is reversed in a middle portion of the f-θ lens.

Here, in this embodiment, the term "middle portion" of the f-θ lens 6 refers to any lens surface position through which the light ray can pass when any image height between the center of an image and the end of the image is being scanned. In other words, the middle portion of the f-θ lens refers to any position, inside the effective region, between the optical axis of the imaging optical system and the end of the effective region.

Next, the shape of the f-θ lens with respect to the sub-scan sectional plane will be explained.

Now, a case wherein the refractive power in the sub-scan direction is all given to the light exit surface of the lens at the scan surface 7 side will be considered.

Figure 2:
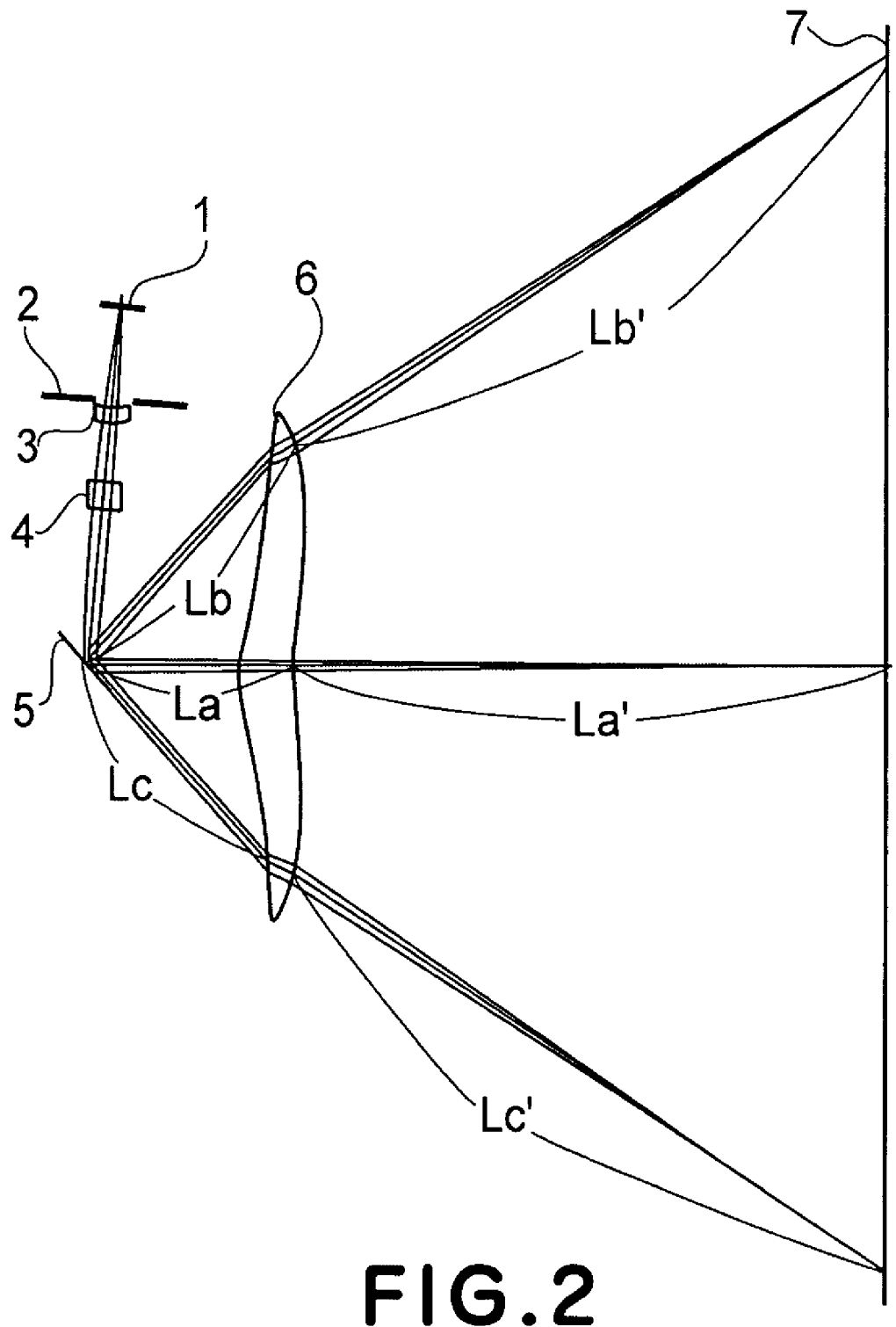
FIG. 2 is a schematic view for explaining an imaging magnification in the sub-scan direction, in the first embodiment of the present invention.

In the sub-scan sectional plane, as described hereinbefore, the reflecting surface 5a of the optical deflector 5 and the scan surface 7 are in an optically conjugate relationship with each other. Referring now to FIG. 2 which shows a main-scan sectional plane similar to FIG. 1A, the imaging magnification at the scan central portion, in the sub-scan direction, can be given by La'/La while the imaging magnifications at the respective scan end portions, in the sub-scan direction, can be given by Lb'/Lb and Lc'/Lc.

As seen from FIG. 2, obviously there are the following relations:

La'/La<Lb'/Lb

La'/La<Lc'/Lc

It is seen that, as compared with the imaging magnification at the scan central portion in the sub-scan sectional plane, the imaging magnifications at the scan end portions in the sub-scan direction become small.

As a result of this, upon the scan surface 7, the light spot diameter in the sub-scan direction becomes large at the scan central portion (near the optical axis of the imaging optical system 6) (as compared with that at the scan end portions), and it becomes small at the scan end portions (as compared with that at the scan central portion).

Hence, on the scan surface 7, the light beam spot diameter in the sub-scan direction is changing and, therefore, output of high-quality image is unattainable.

Furthermore, if a multiple-beam semiconductor laser or the like is used as the light source means 1 in an attempt to attain higher speed operation, the pitch interval of plural imaging points on the scan surface 7 with respect to the sub-scan direction would be different between the scan central portion and the scan end portions. Again, output of high-quality image is unattainable in that occasion.

Effective measures for these inconveniences will be that: the curvatures of both surfaces of the f-θ lens in the sub-scan sectional plane are changed continuously, inside the effective portion of the lens, from the lens optical axis (on-axis portion) toward the lens peripheral portion (off-axis portion) and, by bending the lens shape in the sub-scan sectional plane, the principal plane position in the sub-scan sectional plane is controlled to reduce the change in imaging magnification in the sub-scan direction due to the image height of the light beam incident on the scan surface 7.

In this embodiment, not only the curvatures of both surfaces of the f-θ lens in the sub-scan sectional plane are continuously changed from the lens optical axis toward the lens peripheral portion. Rather, the curvatures of both lens surfaces in the sub-scan sectional plane are continuously changed from the lens optical axis (on-axis) to the lens peripheral portion (off-axis), and the sign of each curvature is reversed in the middle portion, by which the uniformess of the imaging magnification in the sub-scan sectional plane is improved further.

Here, the middle portion of the lens surface at the optical deflector 5 side and the middle portion of the lens surface at the scan surface 7 side may correspond to each other or, alternatively, they may be different from each other.

In a compact imaging optical system as of this embodiment wherein the f-θ lens 6 is relatively close to the optical deflector 5 and the optical path length is short, there is a tendency that the difference between La'/La and Lb'/Lb or Lc'/Lc mentioned hereinbefore becomes large. Therefore, reversing the sign of the curvature of each lens surface in the sub-scan sectional plane would be inevitable.

Figure 3A:
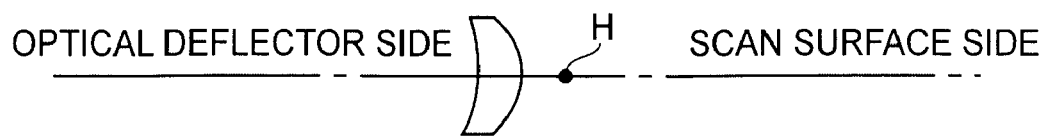
FIG. 3A is a sectional view of an f-θ lens in the sub-scan direction and at the scan center, in the first embodiment of the present invention.
Figure 3B:
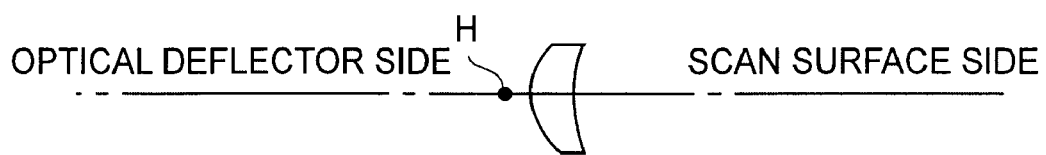
FIG. 3B is a sectional view of the f-θ lens in the sub-scan direction and at the scan end portion, in the first embodiment of the present invention.

FIGS. 3A and 3B are sectional views for explaining the shape of the f-θ lens 6 in the sub-scan sectional plane, at the scan central portion and the scan end portion, respectively. FIG. 3A is a sectional view corresponding to the scan central portion, and FIG. 3B is a sectional view corresponding to the scan end portions.

At the scan central portion shown in

FIG. 3A, the light entrance surface of the f-θ lens at the optical deflector 5 side has a meniscus shape of positive power, having a concaved surface facing the optical deflector 5 side. With this arrangement, the principal plane in the sub-scan sectional plane can be close to the scan surface 7 side, and the imaging magnification can be made small.

On the other hand, with regard to the scan end portions shown in FIG. 3B, the light exit surface of the f-θ lens at the scan surface 7 side has a meniscus shape of positive power, having a concaved surface facing the scan surface 7 side. With this arrangement, the principal plane in the sub-scan sectional plane can be close to the optical deflector 5 side, and the imaging magnification can be made small.

Through these structural features, the imaging magnification in the sub-scan sectional plane can be maintained constant throughout the whole effective scan region upon the scan surface 7.

More specifically, where the curvature radius of the lens surface of the f-θ lens, at the optical deflector 5 side, around the optical axis thereof and in the sub-scan sectional plane is denoted by $rl_0$, the following relation is satisfied:

$$rl_0 < 0 \qquad \text{(Condition 1)}$$

Here, the sign of the curvature radius (unit: mm) is defined as being positive where the center of curvature is at the right-hand side of the surface vertex and as being negative where the center of curvature is at the left-hand side of the surface vertex.

The curvature can be defined as 1/(curvature radius).

With regard to the lens shape at the scan end portions (peripheral portions) shown in FIG. 3B with respect to the sub-scan sectional plane, spherical aberration in the sub-scan direction can be very easily produced by such shape and the profile of the imaged light spot is easily degraded.

In consideration of this, it is desirable to make the curvature radius of the lens surface (light exit surface) at the scan surface 7 side as large as possible.

Hence, in this embodiment, as compared with the curvature radius of the lens surface (light entrance surface) at the optical deflector 5 side as shown in FIG. 3A, the curvature radius of the lens surface (light exit surface) at the scan surface 7 side as shown in FIG. 3B is made large, so as to avoid degradation of the spherical aberration in the sub-scan direction, at the opposite scan end portions.

More specifically, where the least quantity of an absolute value of the curvature radius, within the lens effective region, of such portion in which the sign of the curvature of the lens surface (light exit surface) at the scan surface 7 side, around the optical axis thereof, is reversed, is denoted by $|r2|_{min}$, the shape of the lens surface in the sub-scan sectional plane is specified so as to satisfy the following condition:

$$|rl_0| < |r2|_{min} \qquad \text{(Condition 2)}$$

With this arrangement, the spherical aberration in the sub-scan direction can be kept well throughout the whole effective scan region upon the scan surface 7, and thus degradation of the spot profile is prevented effectively.

In a case where, as in this embodiment, the curvature of each lens surface of the f-θ lens 6 in the sub-scan sectional plane changes continuously from the lens optical axis toward the lens peripheral portion and the sign of the curvature is reversed at the middle thereof, there is a tendency that the rate of change in curvature in the sub-scan sectional plane becomes relatively large.

Figure 4:
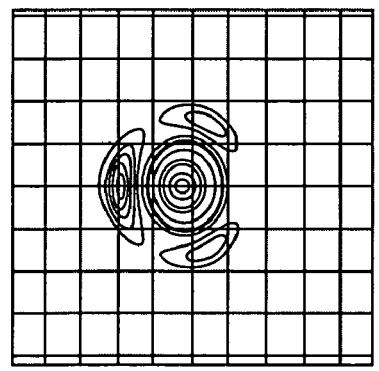
FIG. 4 is an illustration for explaining the shape of a light spot in a case where the curvature radius of the f-θ lens in the sub-scan sectional plane, in the first embodiment of the present invention, changes largely.

If the curvature in the sub-scan sectional plane changes too large inside the light flux, the light spot will be deformed into a bulky shape such as shown in FIG. 4 and, also, the intensity of the side lobe will increase to cause degradation of the spot profile.

In consideration of it, according to this embodiment, in order to avoid this and to keep a good spot profile, the shape of the lens surface in the sub-scan sectional plane is specified so that, when the curvature 1/r' in the sub-scan sectional plane is expressed in terms of a function 1/r'=f(y) of the coordinate y of the lens in the main-scan direction (lengthwise direction), in relation to both surfaces of the lens an absolute value of a first differential of the curvature 1/r' satisfies the following relation:

$$\left|\frac{d}{dy}\frac{1}{r'}\right| = \left|\frac{d}{dy}f(y)\right| \le 2.0 \times 10^{-2} \qquad \text{(Condition 3)}$$

With this arrangement, the quantity of change in curvature in the sub-scan sectional plane, inside the light flux, can be reduced and degradation of the light spot profile is prevented effectively. Hence, an optical scanning system that enables output of high-quality images is accomplished.

Condition 3 mentioned above is a condition for maintaining good spot profile.

If the upper limit of Condition 3 is exceeded, the quantity of change of curvature in the sub-scan sectional plane, inside the light flux, becomes large and degradation of the spot undesirably becomes worse beyond the tolerable range.

Condition 3 can preferably be changed as follows:

$$\left|\frac{d}{dy}\frac{1}{r'}\right| = \left|\frac{d}{dy}f(y)\right| \le 1.5 \times 10^{-2} \qquad \text{(Condition 3a)}$$

In this embodiment, a light beam being convergent in the main-scan direction is incident on the f-θ lens, by which the optical path length is reduced further. However, if a convergent light beam is incident on the f-θ lens, the f-θ characteristic becomes asymmetric between the scan start side and the scan end side.

In consideration of it, in this embodiment, the curvature of the lens surface (light entrance surface) of the f-θ lens 6 at the optical deflector 5 side in the main-scan sectional plane is changed continuously and asymmetrically from the lens optical axis toward the lens peripheral portion.

At the optical axis, the power of the f-θ lens in the main-scan direction as well as the power thereof in the sub-scan direction are positive.

With this arrangement, the asymmetry of f-θ characteristic at the scan start side and the scan end side can be corrected well.

On the other hand, although the position of the reflecting surface of the optical deflector 5 shifts in the optical axis direction of the f-θ lens 6 as the scan by the optical deflector 5 goes on, the amount of shift is not symmetrical between the scan start side and the scan end side. As a result, the field curvature in the sub-scan direction becomes asymmetric between the scan start side and the scan end side.

In consideration of it, in this embodiment, the curvature of the lens surface (light entrance surface) of the f-θ lens 6 at the optical deflector 5 side, in the sub-scan sectional plane, is changed continuously and asymmetrically from the lens optical axis toward the lens peripheral portion.

With this arrangement, the asymmetry of curvature field in the sub-scan direction between the scan start side and the scan end side is corrected well.

Furthermore, with regard to the aspherical surface shape of the f-θ lens 6 of this embodiment, where the point of intersection between each lens surface and the optical axis is taken as an origin, the optical axis direction is taken as X axis, an axis which is orthogonal to the optical axis within the main-scan sectional plane is taken as Y axis, an axis which is orthogonal to the optical axis within the sub-scan sectional plane is taken as Z axis, where the shape of the light entrance surface or the light exit surface of the f-θ lens 6 in the main-scan sectional plane is expressed in terms of x=g(y), and where an absolute value of the difference between a second differential quantity of x at an arbitrary lens surface position y mm in the main-scan direction inside the effective scan region and a second differential quantity of x at another lens surface position y+0.01 mm in the main-scan direction is expressed by $|\delta d^2 x/dy^2|$, both the shape of the light entrance surface and the shape of the light exit surface of the f-θ lens 6 with respect to the main-scan sectional plane are designed to satisfy the following relation:

$$|\delta d^2 x/dy^2| < 0.00003 \quad \text{(Condition 4)}$$

An f-θ lens having aspherical surfaces at both of light entrance surface and light exit surface may preferably be made by using a plastic molding process. In that occasion, mirror-finished-surface mold pieces having been shaped in accordance with the respective lens surfaces are used with a modling machine. In ordinary molding machines, however, the reproducibility of relative position in each mirror-finished surface would have an error of about 0.01 mm.

Particularly, if such positional error occurs in the main-scan direction of the lens, it causes a focus error in the main-scan direction. In this embodiment, however, each lens surface of the f-θ lens 6 has a shape designed to satisfy Condition 4 mentioned above, by which the focus error can be avoided efficiently.

If the upper limit of Condition 4 is exceeded, due to errors in the reproducibility of relative position of each mirror-finished surface in the molding machine, the performance will be unstable such that production of f-θ lenses of fixed performance becomes difficult to accomplish.

Table 1—1 and Table 1-2 below show specifications of the optical system of the optical scanning system according to this embodiment of the present invention.

TABLE 1-1

| Used Reference Wavelength | λ | nm | 790 |
|---|---|---|---|
| No. of Emission Points | n | | 1 |
| Semiconductor Laser Cover Glass Thickness | | deg mm | 0.25000 |
| Semiconductor Laser Cover Glass Refractive Index | n0 | | 1.51052 |
| Emission Point to Aperture Stop | d0 | mm | 19.03925 |
| Aperture Stop Diameter | | Main-Scan: 2.4 mm | Sub-Scan: 1.16 mm |
| Aperture Stop Shape | | elliptical | |
| Aperture Stop to Collimator Lens 1st Surface | d1 | mm | 1.00000 |
| Collimator Lens 1st Surface Curvature Radius | R1 | mm | infinite |
| Collimator Lens Thickness | d2 | mm | 3.00000 |
| Collimator Lens Refractive Index | n1 | | 1.51052 |
| Collimator Lens 2nd Surface Curvature Radius | R2 | mm | −10.53340 |
| Collimator Lens 1st Surface to Cylindrical Lens 1st Surface | d3 | mm | 10.00000 |
| Cylindrical Lens 1st Surface Curvature Radius in Sub-Scan Direction | Rs3 | mm | 17.09180 |
| Cylindrical Lens 1st Surface Curvature Radius in Main-Scan Direction | Rm3 | mm | infinite |
| Cylindrical Lens Thickness | d4 | mm | 5.00000 |
| Cylindrical Lens Refractive Index | n3 | | 1.51052 |
| Cylindrical Lens 2nd Surface Curvature Radius | R4 | mm | infinite |
| Cylindrical Lens 2nd Surface to Deflective Reflection Surface | d5 | mm | 27.53856 |
| Deflective Reflection Surface to f-θ Lens 1st Surface | d6 | mm | 26.60000 |
| F-θ Lens Thickness | d7 | mm | 9.00000 |
| F-θ Lens Refractive Index | n7 | | 1.52397 |
| F-θ Lens to Scan Surface | d8 | mm | 103.54233 |
| F-θ Lens Focal Length in Main-Scan Direction | f2 | mm | 201.77147 |
| Angle between Incidence Optical System and f-θ Lens | γ | deg | 85.00000 |
| Polygon Circumscribing Circle Radius | r | mm | 10.00000 |
| Largest Scan Angle | η | deg | 48.60000 |

TABLE 1-1-continued

| Incident Light Natural Convergence Point: Distance from Scan Surface | Sk | mm | 166.07456 |
|---|---|---|---|
| No. of Polygon Surfaces | | men | 4 |

TABLE 1-2

F-θ LENS SHAPE

| FIRST SURFACE | | SECOND SURFACE | |
|---|---|---|---|
| R | 43.01627 | R | 67.30817 |
| k | −1.69442E−01 | k | 7.84032E−01 |
| B4u | −1.57436E−05 | B4 | −1.11698E−05 |
| B6u | 1.17898E−08 | B6 | 5.48316E−09 |
| B8u | −6.00679E−12 | B8 | −1.54620E−12 |
| B10u | 1.29380E−15 | B10 | 2.91108E−17 |
| B12u | −1.14323E−21 | B12 | 3.70670E−20 |
| B14u | −2.62045E−23 | B14 | −5.17290E−24 |
| B16u | −1.07853E−26 | B16 | 2.01896E−29 |
| B4l | −1.57277E−05 | | |
| B6l | 1.15033E−08 | | |
| B8l | −5.49756E−12 | | |
| B10l | 9.34705E−16 | | |
| B12l | 5.93019E−20 | | |
| B14l | 1.75863E−23 | | |
| B16l | −2.69335E−26 | | |
| r | −14.10000 | r | −8.57483 |
| D2u | 2.09052E−04 | D2 | 1.45833E−04 |
| D4u | −2.20557E−07 | D4 | −1.91560E−07 |
| D6u | 3.66712E−11 | D6 | 2.11132E−10 |
| D8u | 1.16756E−13 | D8 | −1.56466E−13 |
| D10u | −6.07114E−17 | D10 | 5.37586E−17 |
| D12u | −1.13586E−21 | D12 | 1.31163E−20 |
| D14u | 3.89310E−24 | D14 | −8.78106E−24 |
| D16u | 0.00000E+00 | D16 | 0.00000E+00 |
| D2l | 2.03343E−04 | | |
| D4l | −2.12273E−07 | | |
| D6l | 3.64717E−11 | | |
| D8l | 1.12593E−13 | | |
| D10l | −6.25553E−17 | | |
| D12l | 2.37276E−21 | | |
| D14l | 3.09511E−24 | | |
| D16l | 0.00000E+00 | | |

In accordance with this embodiment of the present invention, when the scan width of the scan line on the scan surface 7 is about 216 mm (A4 size), an optical scanning system having an optical path length not greater than 150 mm is accomplished.

With regard to the aspherical surface shape of the f-θ lens in the main-scan sectional plane, where the point of intersection between each lens surface and the optical axis is taken as an origin, the optical axis direction is taken as X axis, an axis orthogonal to the optical axis within the main-scan sectional plane is taken as Y axis, and an axis orthogonal to the optical axis within the sub-scan sectional plane is taken as Z axis, the aspherical surface can be given by the following relation:

$$x = \frac{y^2/R}{1 + \left(1 - (1+k)(y/R)^2\right)^{1/2}} + \sum_{i=4}^{16} B_i y^i$$

wherein R is the curvature radius, and k and $B_4$–$B_{16}$ are aspherical coefficients.

With regard to the shape in the sub-scan sectional plane, it is designed so that the curvature radius r' where the lens surface coordinate in the main-scan direction is Y, is given by the following relation:

$$r' = r\left(1 + \sum_{j=2}^{16} D_j y^j\right)$$

wherein r is the curvature radius at the optical axis, and $D_2$–$D_{16}$ are coefficients.

The coefficient may be different between the scan start side and the scan end side and, in that case, coefficients at the scan start side (upper side as viewed in FIG. 1) are given with a suffix "u", while coefficients at the scan end side (lower side as viewed in FIG. 1) are given with a suffix "l".

Figure 5:
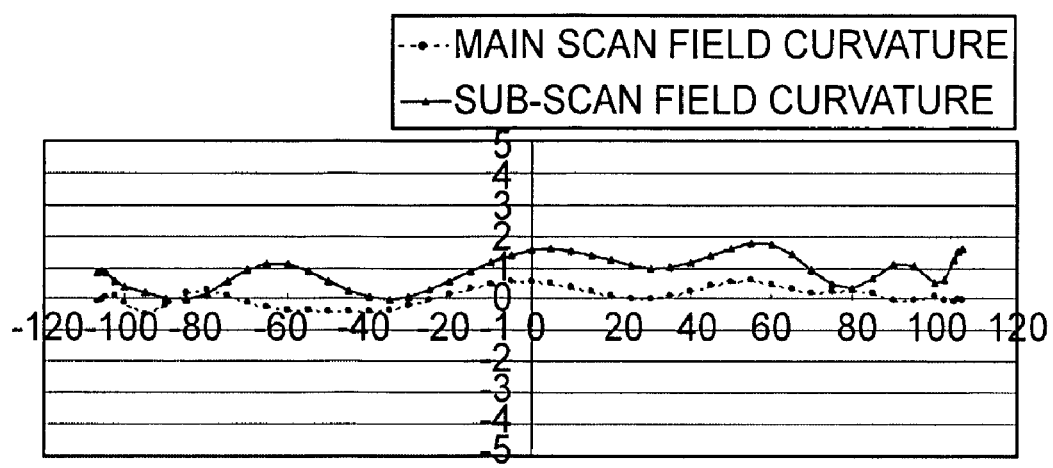
FIG. 5 is an aberration graph, showing main-scan field curvature and sub-scan field curvature of the f-θ lens according to the first embodiment of the present invention.

FIG. 5 is an aberration graph, showing field curvature in the main-scan direction and the sub-scan direction. In FIG. 5, the axis of abscissas corresponds to image height (main-scan direction). In the aberration graph of FIG. 5, the unit of both the axis of ordinates and the axis of abscissas is millimeters.

Figure 6:
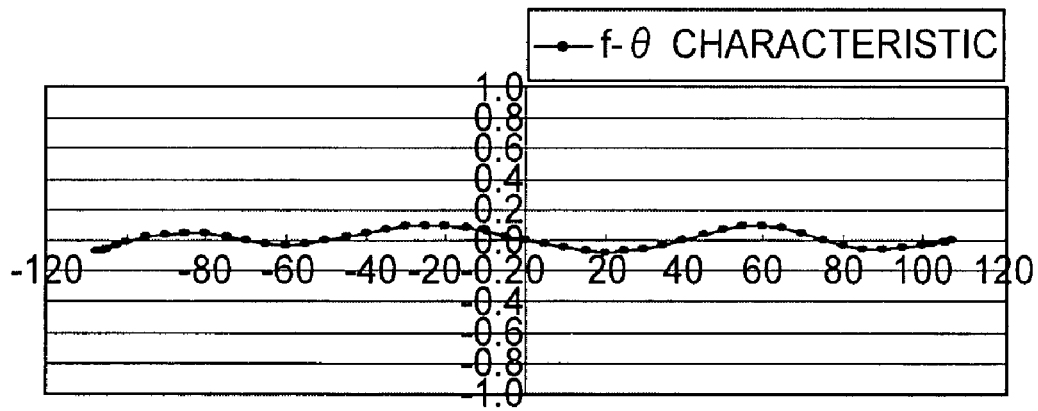
FIG. 6 is an aberration graph, showing the f-θ characteristic of the f-θ lens according to the first embodiment of the present invention.

FIG. 6 is an aberration graph, showing the f-θ characteristic. Along the axis of ordinates, differences between idealistic image height and actual image height are plotted. In FIG. 6, the axis of abscissas corresponds to image height (main-scan direction).

In the f-θ lens 6 of this embodiment, the curvature of the lens surface at the optical integrator 5 side in the main-scan sectional plane changes continuously and asymmetrically from the lens optical axis toward the lens peripheral portion. As a result of this, the asymmetry of the f-θ characteristic between the scan start side and the scan end side is corrected satisfactorily.

Figure 7:
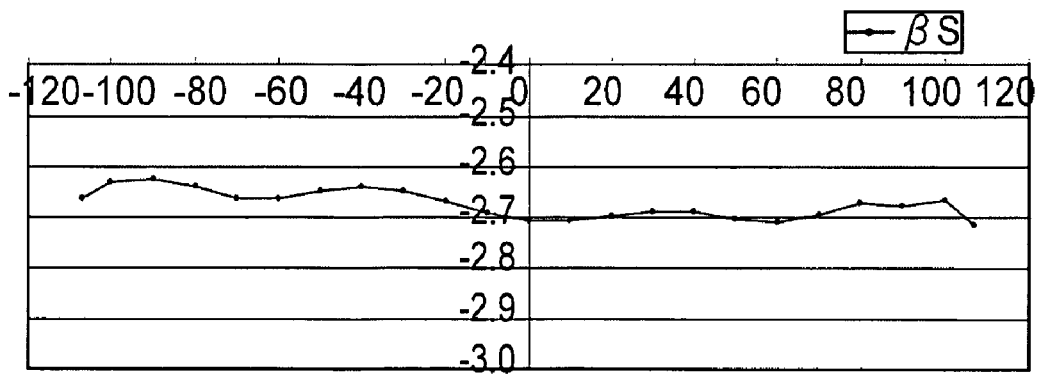
FIG. 7 is a graph, showing an imaging magnification of the f-θ lens in the sub-scan sectional plane according to the first embodiment of the present invention.

FIG. 7 is a graph, showing the imaging magnification with respect to the sub-scan sectional plane. In FIG. 7, the axis of abscissas corresponds to image height (main-scan direction).

In this embodiment, the curvatures of the opposite lens surfaces of the f-θ lens 6 in the sub-scan sectional plane change continuously from the lens optical axis toward the lens peripheral portion and, at a middle portion thereof, the sign of each curvature is reversed. With this arrangement, the imaging magnification with respect to the sub-scan sectional plane is uniformed further.

Figure 8:
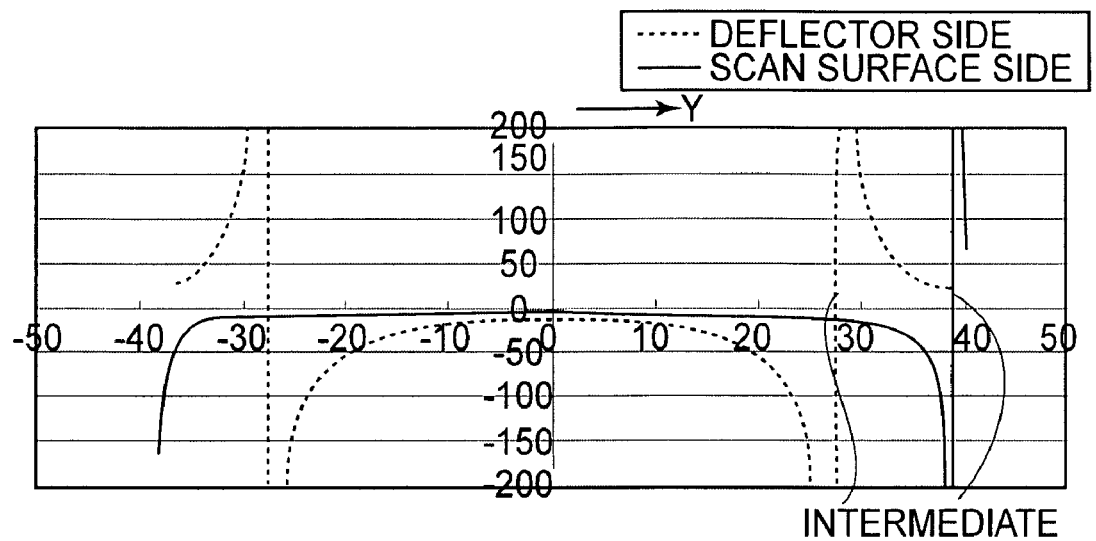
FIG. 8 is a graph, showing the curvature radii of opposite surfaces of the f-θ lens in the sub-scan sectional plane according to the first embodiment of the present invention, the curvature radii being plotted while the coordinate y in the lengthwise direction of the lens is taken on the axis of abscissa.

FIG. 8 is a graph in which the curvature radii of the opposite lens surfaces of the f-θ lens according to this embodiment, with respect to the sub-scan sectional plane, are plotted while the coordinate y of the imaging lens 6 in the main-scan direction (lengthwise direction) is taken on the axis of abscissas. Dotted lines in the drawing depict the curvature radius of the light entrance surface, at the deflector 5 side, with respect to the sub-scan sectional plane, while solid lines depict the curvature radius of the light exit surface, at the scan surface 7 side, with respect to the sub-scan sectional plane.

It is seen from FIG. 8 that the curvature radius of each of the opposite surfaces of the imaging lens 6 in the sub-scan sectional plane continuously changes from the lens optical axis toward the lens peripheral portion, and that in a middle portion thereof the sign of the curvature is reversed.

Here, the curvature radius $rl_0$ of the lens surface around the optical axis, at the deflector 5 side, with respect to the sub-scan sectional plane is $rl_0 = -14.1$, and this satisfies Condition 1 mentioned hereinbefore.

On the other hand, the least quantity $|r2|_{min}$ of the absolute value of the curvature radius of the lens surface (light exit surface) at the scan surface 7 side, around the optical axis, within the lens effective portion and inside the region in which the sign of curvature is reversed, is $|r2|_{min} = 66.04122$, and it is seen that this satisfies Condition 2 mentioned hereinbefore.

In the f-θ lens 6 according to this embodiment, the shape is designed so that the curvature radius of the surface, at the scan surface 7 side, with respect to the sub-scan sectional plane does not become too small and, by doing so, degradation of spherical aberration in the sub-scan direction at the scan end portions is avoided. The unit of the curvature is 1/mm.

Figure 9:
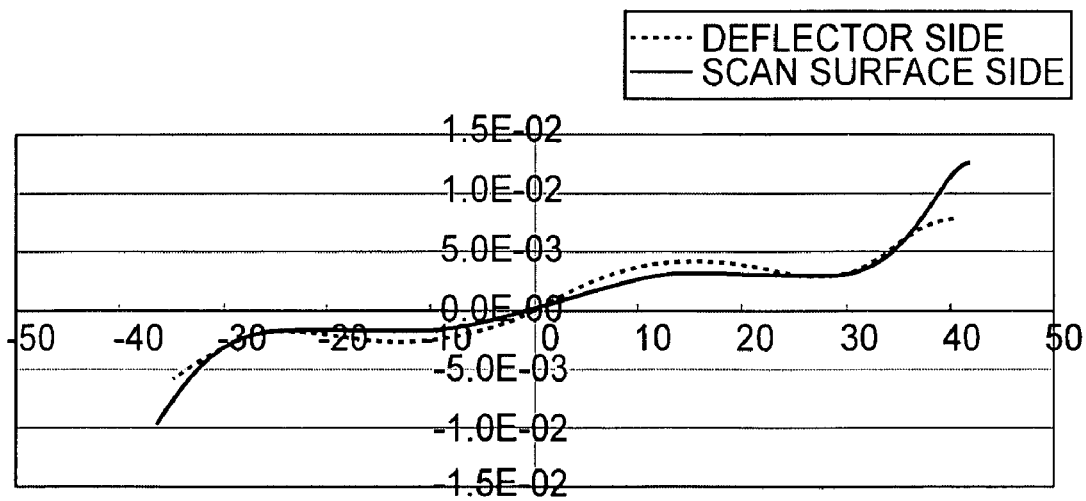
FIG. 9 is a graph wherein, when the curvature 1/r' in the sub-scan sectional plane of the opposite surfaces of the f-θ lens of the first embodiment of the present invention is expressed in terms of a function 1/r'=f(y) of the lens-lengthwise-direction coordinate y, an absolute value of a first differential of 1/r' given by an equation $$\left|\frac{d}{dy}\frac{1}{r'}\right| = \left|\frac{d}{dy}f(y)\right|$$

FIG. 9 is a graph in which, when the curvature 1/r' of the opposite surfaces of the f-θ lens 6 of this embodiment in the sub-scan sectional plane is expressed in terms of a function $1/r' = f(y)$ of the coordinate y of the lens in the main-scan direction (lengthwise direction), the quantity of a first differential of 1/r' according to the following relation is plotted while taking the coordinate y of the lens in the main-scan direction on the axis of abscissas:

$$\frac{d}{dy}\frac{1}{r'} = \frac{d}{dy}f(y)$$

It is seen from this graph that, in both the lens surface (light entrance surface) at the deflector 5 side and the lens surface (light exit surface) at the scan surface 7 side, an absolute value of a first differential of 1/r', that is $$\left|\frac{d}{dy}\frac{1}{r'}\right| = \left|\frac{d}{dy}f(y)\right|$$

satisfies Condition 1. Therefore, the amount of change of the curvature in the sub-scan sectional plane, inside the light flux, can be suppressed, and degradation of light spot profile can be avoided effectively. Hence, an optical scanning system capable of outputting high-quality images is accomplished.

FIG. 14 is a graph in which an absolute value $|\delta d^2 x/dy^2|$ of the difference between a second differential quantity of x at a coordinate y mm of the f-θ lens 6 in this embodiment and a second differential quantity of x at another coodinate y+0.01 mm is plotted while taking the coordinate y of the lens in the main-scan direction on the axis of abscissas. The axis of abscissas of FIG. 14 corresponds to the coordinate of the lens surface in the main-scan direction.

It is seen from this graph that, in both the light entrance surface and the light exit surface, the absolute value of the difference between the second differential quantity of x at the lens surface coordnate y mm and the second differential quantity of x at the coordinate y+0.01 mm satisfies Condition 4 mentioned hereinbefore. Hence, production of f-θ lens having stable performance through a plastic molding process is satisfactorily enabled.

FIG. 10 is an illustration, showing the profile of imaged light spots at respective scan positions upon the scan surface 7, in this embodiment. Numerals in this drawing denote scan positions, and the spots are illustrated in section in terms of intensity of 0.05, $1/e^2$, 1/e and 0.5, respectively, where the peak intensity of the imaged spot is standardized with respect to 1. The outermost line corresponds to the intensity 0.05 and, from here toward the center, the remaining lines correspond to intensities of $1/e^2$, 1/e and 0.5, respectively.

It is seen from FIG. 10 that the imaged light spots are well corrected, and thus an optical scanning system capable of outputting high-quality images is accomplished.

Particularly, an optical scanning system having compact and simple structure yet being capable of outputting high-quality images, and additionally it being suitably applicable to a multiple-beam scanning process in which a light source having a plurality of light emission points is used and still being able to perform high-speed printing, is accomplished in this embodiment.

Embodiment 2

Next, an optical scanning system according to a second embodiment of the present invention will be described.

This embodiment differs from the first embodiment in that the light source means comprises a monolithic multiple-beam semiconductor laser having two light emission points. The remaining portion has a similar structure and optical function as of the first embodiment, and similar advantageous results are obtained therefrom.

Although in this embodiment a monolithic multiple-beam semiconductor laser having two light emission points is used, the present invention is applicable also where a monolithic multiple-beam semiconductor laser having three or more light emission points is used.

As seen in FIG. 7, the imaging magnification, with respect to the sub-scan sectional plane, of the optical scanning system according to the first embodiment is quite uniform inside the effective scan region. If the imaging magnification of the imaging optical system at the optical axis thereof, with respect to the sub-scan sectional plane, is denoted by $\beta s0$ and the imaging magnification of the peripheral portion, off the optical axis, with respect to the sub-scan sectional plane is denoted by $\beta s1$, the relation $$|(\beta s1-\beta s0)/\beta s0|\leq 0.1$$

is satisfied there.

Hence, even when a multiple-beam semiconductor laser is used as light source means, the beam interspace on the scan surface 7 in the sub-scan direction can be made uniform throughout the effective scan region on the scan surface 7. Therefore, by use of a multiple-beam semiconductor laser, high speed operation is accomplished.

The monolithic multiple-beam semiconductor laser used in this embodiment has two emission points. The emission wavelength thereof is 790 nm, and the emission point interspace is 90 μm.

In order to assure that light spots from the two light emission points are imaged on the scan surface 7, at an interspace of 42.3 μm in the sub-scan direction that corresponds to 600 DPI, as shown in FIG. 11 the semiconductor laser is disposed with a tilt of an angle δ=4.162 deg. with respect to the main-scan direction.

FIG. 12 illustrates the pitch interval error of the two beams upon the scan surface 7 in the sub-scan direction, with respect to the predetermined interspace 42.3 μm, where the semiconductor laser is disposed as described above. In FIG. 12, the axis of ordinates corresponds to the amount of pitch interval error, and the unit thereof is μm. The axis of abscissas corresponds to the image height (main-scan direction).

It is seen from FIG. 12 that, when the multiple-beam scan is carried out, the pitch interval error in the sub-scan direction is less than 1 μm throughout the whole scan region, and the interspace error is being corrected quite satisfactorily. Therefore, higher speed operation is easily accomplished.

It should be noted that the number of light emission points is not limited to two, and three or more light emission points may be used with a result of further improvements in the operation speed.

Although in the first and second embodiments of the present invention described hereinbefore, the imaging optical system is provided by a single imaging lens, the present invention is not limited to this and two or more imaging lenses may be used therein.

Furthermore, although in these embodiments a single imaging lens with lens surfaces both having a non-arcuate shape in the main-scan sectional plane is used, the present invention is not limited to this and two or more imaging lenses may be used.

Embodiment of Image Forming Apparatus

FIG. 15 is a schematic and sectional view, in the sub-scan direction, of a main portion of an image forming apparatus according to the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material)

112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 15) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 15) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 15, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

Embodiment of Color Image Forming Apparatus

FIG. 16 is a schematic view of a main portion of a color image forming apparatus according to an embodiment of the present invention. This embodiment is directed to a tandem type color image forming apparatus in which four optical scanning systems are provided so as to record imagewise data upon the surfaces of corresponding photosensitive drums (image bearing members) in parallel to each other.

In FIG. 16, denoted generally at 60 is a color image forming apparatus, and denoted at 11, 12, 13 and 14 are optical scanning systems having a structure according to any one of the preceding embodiments. Denoted at 21, 22, 23 and 24 are photosensitive drums (image bearing members), and denoted at 31, 32, 33 and 34 are developing devices, respectively. Denoted at 51 is a conveyance belt.

In FIG. 16, the cooler image forming apparatus receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and K (black).

These imagewise data are inputted into the optical scanning systems 11, 12, 13 and 14, respectively. In response, these optical scanning systems produce light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the cooler image forming apparatus of this embodiment, four optical scanning systems 11, 12, 13 and 14 are provided and these correspond to colors of C (cyan), M (magenta), Y (yellow) and K (black), respectively. These scanning systems are operable in parallel to each other to record imagewise signals upon the surfaces of the photosensitive drums 21, 22, 23 and 24, respectively, so that a color image can be printed at high speed.

As described, the color image forming apparatus of this embodiment uses four optical scanning systems 11, 12, 13 and 14 to produce latent images for different colors upon the surfaces of corresponding photosensitive drums 21, 22, 23 and 24, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Applications No. 2005-126491 filed Apr. 25, 2005, and No. 2006-067782 filed Mar. 13, 2006, for which is hereby incorporated by reference.

What is claimed is:

1. An optical scanning system, comprising:

light source means;

deflecting means configured to deflect a light beam emitted from said light source means in a main-scan direction; and an imaging optical system configured to image the light beam, deflected by said deflecting means, on a scan surface to be scanned;

wherein, in a sub-scan sectional plane, said imaging optical system is configured to place a deflecting surface of said deflecting means and the scan surface in a conjugate relationship with each other;

wherein a curvature, in the sub-scan sectional plane, of both of a light entrance surface and a light exit surface of at least one imaging optical element that is a constituent component of said imaging optical system changes, inside an effective region, continuously from an optical axis of said imaging optical system toward a peripheral portion of the same, and wherein a sign of each of the curvatures of the light entrance surface and the light exit surface of said imaging optical element with respect to the sub-scan sectional plane is reversed within the effective region;

wherein, when a curvature radius of the light entrance surface of said imaging optical element at the optical axis thereof, with respect to the sub-scan sectional plane, is denoted by $r1_0$ and when a least quantity of an absolute value of the curvature radius in the sub-scan sectional plane of a portion inside the effective region, in which portion the sign of the curvature is reversed with respect to the curvature of the light exit surface of said imaging optical element at the optical axis thereof, in the sub-scan sectional plane, is denoted by $|r2|_{min}$, the following relations rl$_0$<0 and

|rl$_0$|<|r2|$_{min}$ are satisfied; and wherein, when a shape x of the light entrance surface or the light exit surface of said imaging optical element in a main-scan sectional plane is expressed in terms of a function x=g(y) of an arbitrary coordinate y in the main-scan direction inside an effective scan region of said imaging optical element and when an absolute value of a difference between a second differential quantity of x at the coordinate y and a second differential quantity of x at a coordinate y+0.01 is denoted by |δd$^2$x/dy$^2$|, both the light entrance surface and the light exit surface of said imaging optical element satisfy the following relation

|δd$^2$x/dy$^2$|<0.00003.

2. An optical scanning system according to claim 1, wherein, when the curvature radius of the light entrance surface or the light exit surface of said imaging optical element in the sub-scan sectional plane is denoted by r', and when the curvature 1/r' in the sub-scan sectional plane is expressed in terms of a function 1/r'=f(y) of the coordinate y of the imaging optical element in the main-scan direction, in relation to both the light entrance surface and the light exit surface of said imaging optical element an absolute value of a first differential of the curvature 1/r' satisfies the following relation $$\left|\frac{d}{dy}\frac{1}{r'}\right| = \left|\frac{d}{dy}f(y)\right| \le 2.0 \times 10^{-2}.$$

3. An optical scanning system according to claim 1, wherein said imaging optical system has only one imaging optical element.

4. An optical scanning system according to claim 3, wherein the light beam incident on said imaging optical element is a convergent light beam with respect to the main-scan sectional plane.

5. An optical scanning system according to claim 4, wherein, in the main-scan sectional plane, both surfaces of said imaging optical element have a non-arcuate shape.

6. An optical scanning system according to claim 5, wherein, in the main-scan sectional plane, the light entrance surface of said imaging optical element has a convexed shape, at the optical axis of said imaging optical element, facing the deflecting means side.

7. An optical scanning system according to claim 6, wherein, in the main-scan sectional plane, the light entrance surface of said imaging optical element has a concaved shape, at the peripheral portion thereof, facing the deflecting means side, and wherein the sign of the curvature of the light entrance surface of said imaging optical element is reversed inside the effective region.

8. An optical scanning system according to claim 7, wherein, in the main-scan sectional plane, the light exit surface of said imaging optical element has a concaved shape, at the optical axis of said imaging optical element, facing the scan surface side.

9. An optical scanning system according to claim 8, wherein, in the main-scan sectional plane, the light exit surface of said imaging optical element has a convexed shape, at the peripheral portion thereof, facing the scan surface side, and wherein the sign of the curvature of the light exit surface of said imaging optical element is reversed inside the effective region.

10. An optical scanning system according to claim 1, wherein, in the main-scan sectional plane, the curvature of at least one optical surface of said imaging optical element changes continuously and asymmetrically from the optical axis toward the peripheral portion thereof.

11. An optical scanning system according to claim 1, wherein, in the sub-scan sectional plane, the curvature of at least one optical surface of said imaging optical element changes continuously and asymmetrically from the optical axis toward the peripheral portion thereof.

12. An optical scanning system, comprising:

light source means;

deflecting means configured to deflect a light beam emitted from said light source means in a main-scan direction; and an imaging optical system configured to image the light beam, deflected by said deflecting means, on a scan surface to be scanned;

wherein, in a sub-scan sectional plane, said imaging optical system is configured to place a deflecting surface of said deflecting means and the scan surface in a conjugate relationship with each other;

wherein a light entrance surface of at least one imaging optical element that is a constituent component of said imaging optical system has, at an optical axis thereof, a convexed shape facing the deflecting means side with respect to a main-scan sectional plane and a concaved shape facing the deflecting means side with respect to the sub-scan sectional plane;

wherein the light entrance surface of said imaging optical element has, at a peripheral portion thereof, a concaved shape facing the deflecting means side with respect to the main-scan sectional plane and a convexed shape facing the deflecting means side with respect to the sub-scan sectional plane;

wherein a light exit surface of said imaging optical element has, at the optical axis thereof, a concaved shape facing the scan surface side with respect to the main-scan sectional plane and a convexed shape facing the scan surface side with respect to the sub-scan sectional plane;

wherein the light exit surface of said imaging optical element has, at a peripheral portion thereof, a convexed shape facing the scan surface side with respect to the main-scan sectional plane and a concaved shape facing the scan surface side with respect to the sub-scan sectional plane; and wherein, when the shape x of the light entrance surface or the light exit surface of said imaging optical element in the main-scan sectional plane is expressed in terms of a function x=g(y) of an arbitrary coordinate y in the main-scan direction inside an effective scan region of said imaging optical element and when an absolute value of a difference between a second differential quantity of x at the coordinate y and a second differential quantity of x at a coordinate y+0.01 is denoted by |δd$^2$x/dy$^2$|, both the light entrance surface and the light exit surface of said imaging optical element satisfy the following relation

|δd$^2$x/dy$^2$|<0.00003.

13. An optical scanning system according to claim 12, wherein said imaging optical system has only one imaging optical element.

14. An optical scanning system according to claim 13, wherein the light beam incident on said imaging optical element is a convergent light beam with respect to the main-scan sectional plane.

15. An optical scanning system according to claim 14, wherein, when a curvature radius of the light exit surface of said imaging optical element at the optical axis thereof, with respect to the sub-scan sectional plane, is denoted by $rl_0$ and a least quantity of an absolute value of the curvature radius of a portion inside the effective region, in which portion the sign of the curvature is reversed with respect to the curvature of the light exit surface of said imaging optical element at the optical axis thereof, is denoted by $|r2|_{min}$, the following relations $rl_0 < 0$ and
$|rl_0| < |r2|_{min}$
are satisfied.

16. An optical scanning system according to claim 15, wherein, when the curvature radius of the light entrance surface or the light exit surface of said imaging optical element with respect to the sub-scan sectional plane is denoted by r', and when the curvature 1/r' in the sub-scan sectional plane is expressed in terms of a function $1/r'=f(y)$ of the coordinate y of the imaging optical element in the main-scan direction, in relation to both the light entrance surface and the light exit surface of said imaging optical system an absolute value of a first differential of the curvature 1/r' satisfies the following relation $$\left| \frac{d}{dy} \frac{1}{r'} \right| = \left| \frac{d}{dy} f(y) \right| \le 2.0 \times 10^{-2}.$$

17. An optical scanning system according to claim 12, wherein, in the main-scan sectional plane, the curvature of at least one optical surface of said imaging optical element changes continuously and asymmetrically from the optical axis toward the peripheral portion thereof.

18. An optical scanning system according to claim 12, wherein, in the sub-scan sectional plane, the curvature of at least one optical surface of said imaging optical element changes continuously and asymmetrically from the optical axis toward the peripheral portion thereof.

19. An optical scanning system according to claim 1 or 12, wherein said light source means includes a plurality of light emitting portions.

20. An image forming apparatus, comprising:
an optical scanning system as recited in claim 1;
a photosensitive material disposed at a scan surface to be scanned;
a developing device for developing an electrostatic latent image formed on said photosensitive material through a light beam scanned by said optical scanning system, to produce a toner image;
a transferring device for transferring the developed toner image onto a transfer material; and
a fixing device for fixing the transferred toner image, on the transfer material.

21. An image forming apparatus, comprising:
an optical scanning system as recited in claim 1; and
a printer controller for converting code data supplied from an outside machine into an imagewise signal and for inputting the imagewise signal into said optical scanning system.

22. A color image forming apparatus, comprising:
an optical scanning systems as recited in claim 1; and
a plurality of image bearing members each being disposed at a scan surface, to be scanned, of said optical scanning system, for forming images of different colors.

23. A color image forming apparatus according to claim 22, further comprising a printer controller for converting a color signal supplied from an outside machine into imagewise data of different colors and for inputting the imagewise data into corresponding optical scanning systems.

24. An image forming apparatus, comprising:
an optical scanning system as recited in claim 12;
a photosensitive material disposed at a scan surface to be scanned;
a developing device for developing an electrostatic latent image formed on said photosensitive material through a light beam scanned by said optical scanning system, to produce a toner image;
a transferring device for transferring the developed toner image onto a transfer material; and
a fixing device for fixing the transferred toner image, on the transfer material.

25. An image forming apparatus, comprising:
an optical scanning system as recited in claim 12; and
a printer controller for converting code data supplied from an outside machine into an imagewise signal and for inputting the imagewise signal into said optical scanning system.

26. A color image forming apparatus, comprising:
an optical scanning systems as recited in claim 12; and
a plurality of image bearing members each being disposed at a scan surface, to be scanned, of said optical scanning system, for forming images of different colors.

27. A color image forming apparatus according to claim 22, further comprising a printer controller for converting a color signal supplied from an outside machine into imagewise data of different colors and for inputting the imagewise data into corresponding optical scanning systems.

* * * * *

UNITED STATES PATENT AND TRADEMARK OFFICE
CERTIFICATE OF CORRECTION

PATENT NO. : 7,149,019 B2
APPLICATION NO. : 11/410095
DATED : December 12, 2006
INVENTOR(S) : Yoshihiro Ishibe It is certified that error appears in the above-identified patent and that said Letters Patent is hereby corrected as shown below:

IN THE DRAWINGS:
Sheet 7, Figure 13, "(PLAVAR)" should read --(PLANAR)--.

COLUMN 1
Line 20, "recoding" should read --recording--.

COLUMN 4
Line 50, "ma" should read --may--.

COLUMN 6
Line 60, "$|\delta d2x / dy2|$" should read --$|\delta d^2 x / dy^2|$--.

COLUMN 13
Line 11, "modling" should read --molding--.

COLUMN 19
Line 55, "cooler" should read --color--.

COLUMN 20
Line 31, "for" should be deleted.

Signed and Sealed this

Eighth Day of May, 2007

JON W. DUDAS
*Director of the United States Patent and Trademark Office*